United States Patent [19]

Flakus

[11] Patent Number: 5,200,463
[45] Date of Patent: Apr. 6, 1993

[54] AQUEOUS, RADIATION-CURABLE URETHANE ACRYLATE EMULSIONS AND PROCESS FOR PRODUCING THE SAME

[75] Inventor: Werner Flakus, Recklinghausen, Fed. Rep. of Germany

[73] Assignee: Huels, AG, Marl, Fed. Rep. of Germany

[21] Appl. No.: 837,960

[22] Filed: Feb. 20, 1992

[30] Foreign Application Priority Data

Apr. 4, 1991 [DE] Fed. Rep. of Germany ....... 4110821

[51] Int. Cl.$^5$ ............................................. C08L 75/00
[52] U.S. Cl. ...................................... 524/591; 528/49
[58] Field of Search ........................... 524/591; 528/49

[56] References Cited

PUBLICATIONS

Ternay, Contemporary Organic Chemistry, WB Saunders & Co., Philadelphia, 1979, p. 1100.

Primary Examiner—Maurice J. Welsh
Attorney, Agent, or Firm—Oblon, Spivak, McClelland, Maier & Neustadt

[57] ABSTRACT

Aqueous, radiation-curable urethane acrylate emulsion and a method of preparing, wherein the urethane acrylate emulsion is prepared by:
  mixing a cyclic polyisocyanate with water at a ratio of NCO equivalents to $H_2O$ moles of about 10-20-:0-1, to form an NCO-containing urea polyisocyanate;
  reacting the NCO-containing urea polyisocyanate with hydroxyethylacrylate at an equivalent ratio of NCO to OH of about 15-20:10-15, to form an NCO-containing urethane urea acrylate;
  reacting the NCO-containing urethane urea acrylate with a polyol in the absence of solvent, at a temperature in the range of 50°-100° C., to form an essentially NCO-free resin; and
  emulsifying the essentially NCO-free resin in water containing a hexose alkoxylate ester of an unsaturated fatty acid as a nonionic surfactant, to give an aqueous, radiation-curable urethane acrylate emulsion which upon curing gives a product which is odorless, waterproof, solvent-resistant, and has excellent mechanical properties.

11 Claims, No Drawings

AQUEOUS, RADIATION-CURABLE URETHANE ACRYLATE EMULSIONS AND PROCESS FOR PRODUCING THE SAME

BACKGROUND OF THE INVENTION

1. Field of the Invention:

The invention relates to the solvent-free manufacture of aqueous, radiation-curable urethane acrylate emulsions of products from the reaction of a cyclic polyisocyanate with water, an hydroxyethyl acrylate, and a polyetherpolyol, in the presence of an aqueous nonionic surfactant.

2. Discussion of the Background:

Urethane acrylates are often used in forming coatings, which are radiation curable. However, their viscosity is often such that urethane acrylates cannot be directly used in doctoring, pour molding, or injection molding, except with the use of low-viscosity thinners. Classical organic solvents are excellent thinners, but prior to radiation-curing they must be evaporated, which is a disadvantageous process. Low molecular weight olefins are also excellent thinners or viscosity regulators, due in part to their solvating capability. But they tend to have high boiling points so that they do not evaporate prior to curing, but interact with the components of the dissolved urethane acrylate during radiation curing to yield polymers. Lower molecular weight olefinic thinners, which do have lower vapor presence, are toxic, give off an unpleasant odor, and are environmentally unacceptable. These problems, along with the trend toward conservation of raw materials and energy, have led to the development of aqueous emulsions which are radiation-curable.

The emulsification of acrylic resins in water can be accomplished with acid resin systems and subsequent neutralization with bases to form anionic emulsions, or with basic resins and subsequent neutralization with acids to form cationic emulsions. Aqueous, ionic solvent-free systems have a number of advantages, as well as certain disadvantages compared with coatings which are applied from solvent-containing systems.

Water-based coatings are increasingly desired, as an alternative to organic solvents for ecological reasons, but solvent-containing coatings still possess superior coating properties, often better than those in aqueous systems.

Commonly known disadvantages of many aqueous systems are their tendency to absorb water. Coatings formed from aqueous systems are known to possess poor weather-resistance, generally attributed to the ionic components of such systems. These problems substantially reduce the areas of potential applicability.

It was considered therefor to use nonionic surfactants to convert the highly viscous resin systems of the prepolymer into stable emulsions with water and thereby eliminate or substantially eliminate the organic solvent.

It has been proposed to emulsify such resins in water without the use of organic solvents, if one uses, e.g., alkyl phenoxylates or polyether polyols. However, the shelf stability of such preparations is limited to several hours or 1-2 days, and hence, they must be used rapidly after formulation.

Improved shelf stability is possible with the aid of, for example a commercially available polyurethane thickener and while such systems provide transparent films of good solvent resistance after physical drying and radiation-curing, their adhesion to smooth substrates is generally poor. Surprisingly, if one tests the water absorptivity of such films, e.g. in 100% relative humidity air, one finds that it has a "blockwise pattern" to the same degree as often occurs in the case of ionic, aqueous systems, where the surface is softened; which means that the coatings are no longer "stackable". Also, they cause pollution.

If one uses a certain proportion of a water-soluble aliphatic alcohol, one can substantially improve the adhesion of the nonionic aqueous emulsion. However, the flash point of such preparations will be undesirably lowered, and residual amounts of alcohol will remain in the cured coating which can promote water absorption by the films.

Thus, it is very difficult to identify a suitable nonionic surfactant which (1) is compatible with urethane acrylates, (2) provides stable aqueous emulsions which yield, after curing, a final film which adheres to the substrate and is elastic, and (3) does not promote water absorption by the coating.

Also, the high melt viscosity of most known aqueous solvent-free emulsions of prepolymeric urethane acrylates or urethane urea acrylates requires that the emulsification be carried out in the temperature range 100°-120° C., i.e., under pressure. In view of the risk of thermal polymerization of the acrylic compounds one cannot exploit these products.

While low molecular weight urethane acrylates can be more readily processed, they yield hard, nonadhering films due to the nature of the resin. It is very difficult to achieve thinning of urethane acrylates using organic thinners, e.g., by partial urea formation with the use of diamines, because the reaction is so vigorous, that the viscosity increases to the point that the material cannot be stirred, and the prepolymer forms a gel as a result of heat localization.

Accordingly, one problem addressed by the present invention is the identification of suitable olefinic nonionic surfactants, which copolymerize with suitable urethane acrylate resins to prevent reemulsifiability, water absorption, and "sweating" of the surfactant out of the coating.

This problem is solved by the use of a hexose alkoxylate ester of an unsaturated fatty acid, as a nonionic surfactant, in solvent-free aqueous urethane acrylate emulsions.

Surprisingly it was found that, beginning with a cyclic diisocyanate or a partially hydrolyzed diisocyanate (to form an urea/diisocyanate), followed by acrylation with hydroxyethyl acrylate, and reacting with a polyol, one can produce a meltable compatible urethane urea diacrylate which can be converted into an aqueous emulsion using the above-mentioned olefinic nonionic surfactant. If avoidance of urea formation is desired, the urethane acrylates produced with the surfactants employed in the present invention, in the absence of water, also have acceptable properties. On the other hand, if urea-containing urethane acrylates are used (see Examples 1 and 2), there are substantial improvements in ultimate tensile strength, elongation at failure, Erichsen cupping, and hardness (pendulum test).

SUMMARY OF THE INVENTION

Accordingly, it is one object of the present invention to provide a process for producing an aqueous radiation-curable urethane acrylate emulsion which does not have the above-mentioned disadvantages and which retains the advantageous properties.

It is another object of the present invention to provide a process for producing aqueous, radiation-curable urethane acrylate emulsions which can be prepared and used as "emulsion concentrates" containing >50 wt.% solids, and preferably 75 wt.% solids.

It is another object of the present invention to provide a process for producing aqueous, radiation-curable urethane acrylate emulsions which can be prepared and used in the form of water dilutions containing 10-50 wt.% solids.

It is another object of the present invention to provide a process for producing aqueous, radiation-curable urethane acrylate emulsions which upon curing give coatings which are odorless, waterproof, solvent-resistant, and have excellent mechanical properties.

It is another object of the present invention to provide aqueous, radiation-curable urethane acrylate emulsions produced by the above-mentioned process.

It is another object of the present invention to provide compositions containing olefinic nonionic surfactants which copolymerize with suitable urethane acrylate resins.

It is another object of the present invention to provide compositions containing a hexose alkoxylate ester of an unsaturated fatty acid as a nonionic surfactant, for use in solvent-free aqueous radiation-curable urethane acrylate emulsions to prevent reemulsifiability, water absorption and "sweating" of the surfactant out of the polyurethane acrylate coating formed on curing.

These and other objects, which will become apparent during the course of the following detailed description, have been achieved by the discovery that a urethane acrylate emulsion of the present invention can be prepared by reacting a cyclic polyisocyanate with water at a ratio of NCO equivalents to $H_2O$ moles of 10-20:0-1, preferably 19:1, followed by reaction with hydroxyethyl acrylate at a ratio of NCO to OH of 15-20:10-15, preferably 19:13, followed by reaction with a polyol in the absence of a solvent, followed by emulsification in water with the use of a nonionic surfactant, typically a hexose alkoxylate ester of an unsaturated fatty acid.

DETAILED DESCRIPTION OF THE PREFERRED EMBODIMENTS

In this invention an aqueous, radiation-curable urethane acrylate emulsion is formed by mixing a cyclic polyisocyanate, particularly isophorone diisocyanate, with water at a ratio of NCO equivalents to $H_2O$ moles of about 10-20:0-1, to form an NCO-containing urea polyisocyanate;

reacting said NCO-containing urea polyisocyanate with hydroxyethyl acrylate at an equivalent ratio of NCO to OH of about 15-20:10-15, to form an NCO-containing urethane urea acrylate; reacting said NCO-containing urethane urea acrylate with a polyol in the absence of solvent, at a temperature in the range of 50°-100° C., to form an essentially NCO-free resin; and emulsifying said essentially NCO-free resin in water containing a hexose alkoxylate ester of an unsaturated fatty acid as a nonionic surfactant.

The emulsions produced according to the invention when dried and radiation-hardened form hard or soft, solvent-resistant films.

The reaction scheme is as follows:

$$OCN-R-NCO + OCN-R-NCO \xrightarrow[-CO_2]{+H_2O}$$

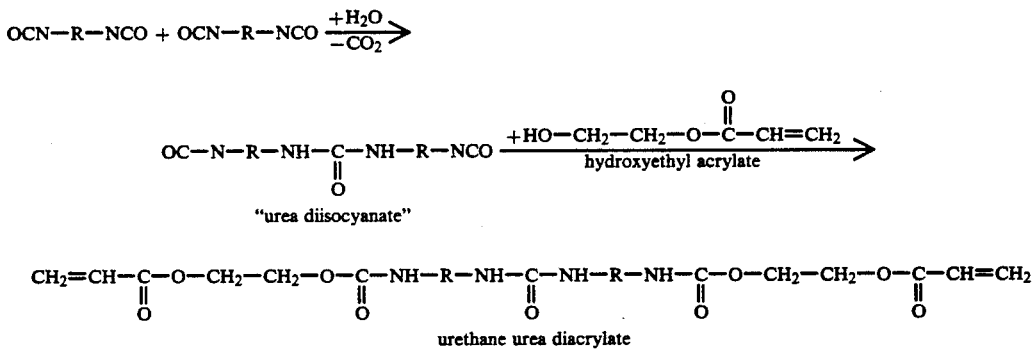

"urea diisocyanate"

urethane urea diacrylate

The reaction with a polyol occurs with additional free NCO groups, from excess diisocyanate or only partially acrylated diisocyanate. This results in additional urethane formation:

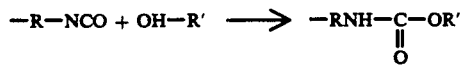

According to the invention, starting with a cyclic diisocyanate, urea formation (formation of urethane urea diacrylates) may occur first in aqueous emulsification of the polymer using surfactants, e.g., with already acrylated reaction products which still contain NCO groups, according to the following scheme:

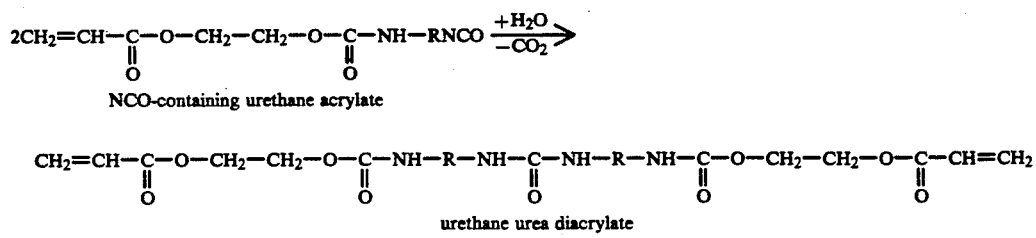

NCO-containing urethane acrylate urethane urea diacrylate

Surviving free NCO groups, from excess diisocyanate and/or partially acrylated urea diisocyanate, then react with the polyol with urea formation.

For comparable film and sheet parameters for the cured resin, the process time is greatly reduced in comparison with urea formation according to the first reaction step.

By modifying the urethane urea acrylates with
(1) an urethane acrylate based on a polyol or polyether polyol,
(2) a polyisocyanate, or
(3) a hydroxyacrylate, a resin preparate which is hard and elastic, or medium hard or soft, can be produced.

Surprisingly, based on the resins of the present invention and the surfactants employed in the present invention, it is possible to prepare an aqueous "emulsion concentrate", having solids content > 50 wt.%, preferably about 75 wt.%, which has adjustable viscosity parameters.

These emulsion concentrates can be stored and shipped, and do not need to be thinned until ready for use. They can be thinned with water at the application worksite to suitable application concentrations in the range of 50 wt.% to c. 10 wt.% solids, with the aid of mechanical means. In this way the shipping of large amounts of water is unnecessary.

The aqueous emulsions of the present invention can be radiation-cured to form very high quality films which normally could only be obtained via difficult reactive paint systems with the use of heat curing (see Examples).

To produce the claimed aqueous, radiation-curable nonionic emulsions, a cyclic plyisocyanate such as the following is suitable:

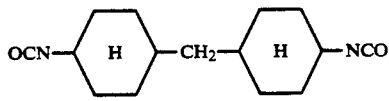

1,1'-methylenebis(4-isocyanatocyclohexane)
(Desmodur W)

bis(isocyanatomethyl)cyclohexane preferably

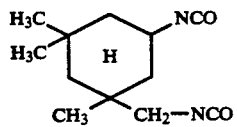

isophoronediisocyanate
(IPDI)

Partial urea components can be prepared, by partial reaction of the NCO equivalents with H$_2$O, as outlined above. In this way it is possible (see Examples) to form the urea either prior to acrylation or at the time of emulsification.

To prepare an emulsion of the present invention, NCO and H$_2$O equivalents are reacted in the ratio 20:1 to 10:1, depending on the desired hardness of the resulting film.

The acrylation of the polyisocyanate is carried out by a conventional method, using hydroxyethyl acrylate in the ratio of NCO: OH of 2:1 to 3:1.

For adjusting the surface hardness and elasticity parameters of the films and coatings resulting after radiation-curing, it is useful to be able to employ soft structure segments as well as hard structure segments. The prepolymer for emulsification, prepared according to the present invention, contains urethane acrylate which is modified with a polyol, preferably with a polyether diol. This is formed by reacting the partially acrylated polyisocyanate with, e.g., polytetrahydrofuran ether diol. The mean molecular weight of this polyether diol (e.g. so-called Terathanes ®, supplied by DuPont) is c. 650, 1000, or 2000. The reaction of the polyisocyanate with the diol is carried out with a ratio of NCO to OH of 5:1 to 4:1.

The emulsification of the urethane urea acrylate is carried out in the presence of a hexose alkoxylate, preferably esterified with an unsaturated fatty acid which copolymerizes with the urethane acrylate during radiation-curing, to form a solvent-resistant, extraction-resistant, hydrophobic film or coating. A particularly suitable surfactant is Atlas G 1350 (supplied by ICI) in a concentration of 5–15 wt.%, preferably 10 wt.% (based on the weight of the resin component).

The urethane urea acrylate is emulsified at a temperature between 50°–95° C., preferably 85° C., depending on the viscosity of the resin, with the addition of small amounts of NH$_4$OH, KOH, or NaOH (pH 9–10) to convert residual NCO to urea. After the emulsion is cooled the pH is adjusted to c. 3–4 with, e.g., phosphoric acid, to yield an aqueous emulsion which is odorless and has good shelf stability.

The radiation-curable aqueous emulsion of the present invention represents a substantial advance over the state of the art, in that:

1. No organic materials are used as processing aids in preparing the emulsion.
2. No organic solvents are used in the formulation to aid in film formation or shelf stability.
3. The emulsion of the present invention is practically odorless, and the film or coating formed after drying and radiation-curing is waterproof, solvent-resistant, and has excellent mechanical properties.
4. The emulsion of the present invention can be prepared and used in the form of so-called "emulsion concentrates" containing > 50 wt.%, preferably 75 wt.% solids, or in the form of water dilutions containing 50–10 wt.% solids.

Having generally described this invention, a further understanding can be obtained by reference to certain specific examples which are provided herein for purposes of illustration only and are not intended to be limiting unless otherwise specified.

EXAMPLE 1

Urethane urea acrylate emulsion:

Basis: Isophoronediisocyanate-urea-polyether polyol.
(Urea formation is by partial reaction of IPDI with H$_2$O according to the reaction scheme given, said reaction being prior to acrylation.)

9 g water (0.5 mol) was added gradually to a vessel containing 1054 q IPDI (4.75 mol) at 80°–90° C. under stirring, with the stirring intensity adjusted to the evolution of $CO_2$. The reaction was continued until the reaction mass had an NCO content of 34.3 wt.%. After addition of 0.18 g dibutyltin dilaurate (DBTL), 1.26 g 2,6-di-tert-butyl-4-methylphenol (Ionol®CP), 19.7 g Tinuvin®292 (neck stabilizer, supplied by Ciba-Geigy), 7.4 g Tinuvin®900 (benzotriazole stabilizer, supplied by Ciba-Geigy), and 4.9 g Irganox®1010 (phenolic stabilizer, supplied by Ciba-Geigy), 766.1 g 2-hydroxyethyl acrylate (6.5 mol, with OH number 476 mg KOH/Q) was added dropwise under stirring, over a period of 30 min. The reaction temperature was 25°–35° C. The reaction was continued an additional 30 min.

Then a melt comprised of 656.1 g polytetrahydrofuran ether diol (1 mol, molecular weight c. 650, OH number 171 mg KOH/G, Terathane®650, supplied by DuPont) and 0.56 g DBTL was pumped in over a period of c. 1 hr.

During the addition of the polyol the reaction temperature was 35°–50° C., then it was raised to 60°–80°–90° C. until complete conversion of the polyol was achieved (NCO content <0.2 wt.%).

250 g Atlas®G 1350 (commercial product of the firm ICI, comprising alkoxylates of hexose esters of unsaturated fatty acids) was dissolved in the largely NCO-free prepolymer, at 90° C. under stirring. Then 945 g $NH_4OH$ (2 wt.%) was added to the reaction mass, the reaction mixture was homogenized, and the melt was thinned with 2666.4 g hot water (50° C.) added under stirring over 20–30 min. After cooling to room temperature, the emulsion was applied to the substrate, either directly or (for some substrates) with pH adjusted to 3–4, e.g. with phosphoric acid. The solids content was c. 43 wt.%.

Data for coating on steel plates and for films were obtained after curing of the emulsion at 200 watt/inch for 5 sec, with addition of 2 wt.% Darocur®1116 (commercial product of Merck, a photoinitiator):

| | |
|---|---|
| Koenig hardness (pendulum test, DIN 53 157) | 157 sec. |
| Erichsen cupping | 10.0 mm. |
| Coating thickness | 40 micron. |
| Tensile strength (DIN 53 455) | 37.8 N/sq mm. |
| Elongation at failure | 11%. |

Solvent resistance:
  Rubbing test at 1 kq/sq cm:
    No damage from acetone, xylene, methyl ethyl ketone,
    or ethanol, in 100 rubs.
  Alkaline washing solution test:
    No damage in 10 30-minute cycles, with 4 wt.% NAOH in water at 80° C.

EXAMPLE 2

Urethane urea acrylate emulsion:

Basis: Isophoronediisocyanate-polyether polyol-urea (Urea formation is with $H_2O$ at the time of emulsification.)

The method was analogous to that of Example 1, with the materials used here being 1054.5 g (4.75 mol) IPDI, 0.18 g DBTL, 1.24 g Ionol®CP, 19.8 g Tinuvin®292, 7.4 g Tinuvin® 900, 5.0 g Irganox®1010, 766.1 g (6.5 mol) 2-hydroxyethyl acrylate, 656.1 g (1 mol) polytetrahydrofuran ether diol, and 0.56 g DBTL. 250 g Atlas®G 1350 was dissolved in the NCO prepolymer containing 1.67 wt.% NCO, at 90° C. under stirring.

Then 936.5 g KOH (1.65 wt.%) was added, followed by 2667.5 g water at 50° C. with stirring, to uniformly mix. After cooling to room temperature, the emulsion was applied to the substrate, either directly or (for some substrates) with pH adjusted to 3–4, e.g. with phosphoric acid. The solids content was c. 43 wt.%.

Data for coating on steel plates and for films were obtained after curing of the emulsion at 200 watt/inch for 5 sec, with addition of 2 wt.% Darocur®1116:

| | |
|---|---|
| Koenig hardness (pendulum test, DIN 53 157) | 146 sec. |
| Erichsen cupping | 8.3 mm. |
| Coating thickness | 40–50 micron. |
| Tensile strength (DIN 53 455) | 45 N/sq mm. |
| Elongation at failure | 7%. |

Solvent resistance:
  Rubbing test at 1 kg/sq cm:
    No damage from acetone, xylene, methyl ethyl ketone, or ethanol, in 100 rubs.
  Alkaline washing solution test:
    No damage in 10 30-minute cycles, with 4 wt.% NaOH in water at 80° C.

EXAMPLE 3

Urethane acrylate emulsion:

Basis: Isophoronediisocyanate-polyether polyol.

The method was analogous to that of Example 1, with the materials used here being 999 g (4.5 mol) IPDI, 0.18 g DBTL, 1.24 g Ionol®CP, 19.8 g Tinuvin®292, 7.4 g Tinuvin®900, 5.0 g Irganox®1010, 825 g (7 mol) 2-hydroxyetyl acrylate, 656.1 g (1 mol) polytetrahydrofuran ether diol, and 0.56 DBTL.

251.4 g Atlas®G 1350 was dissolved in the NCO prepolymer which was substantially free of NCO (<0.2% NCO), at 90° C. under stirring. Then 950 g $NH_4OH$ (2 wt.%) was added, followed by 2686 g water at 50° C., in both cases stirring to homogeneity. After cooling to room temperature, the emulsion was applied to the substrate, either directly or (for some substrates) with pH adjusted to 3–4, e.g. with phosphoric acid. The solids content was c. 43 wt.%.

Data for coating on steel plates and for films were obtained after curing of the emulsion at 200 watt/inch for 5 sec, with addition of 2 wt.% Darocur®1116:

| | |
|---|---|
| Koenig hardness (pendulum test, DIN 53 157) | 103 sec. |
| Erichsen cupping | 8.3 mm. |
| Coating thickness | 70 micron. |
| Tensile strength (DIN 53 455) | 43 N/sq mm. |
| Elongation at failure | 9%. |

Solvent resistance:
  Rubbing test at 1 kg/sq cm:
    No damage from acetone, xylene, methyl ethyl ketone, or ethanol, in 100 rubs.
  Alkaline washing solution test:
    No damage in 10 30-minute cycles, with 4 wt.% NaOH in water at 80° C.

EXAMPLE 4

Urethane acrylate emulsion:

Basis: Isophoronediisocyanate-polyether polyol and bis-isocyanatomethylcyclohexane (HXDI)-polyether polyol.

The method was analogous to that of Example 1, with the materials used here being 1110 g (5.0 mol) IPDI, 582 g (3.0 mol) bis-isocyanatomethylcyclohexane (HXDI), 0.31 g DBTL, 2.38 a Ionol®CP, 38.1 g Tinuvin®292, 14.3 g Tinuvin®900, 9.5 g Irganox®1010, 1414.3 g (12 mol) 2-hydroxyethyl acrylate, 656.1 g (1 mol) polytetrahydrofuran ether diol having m.w. c. 650, 993.9 g (1 mol) polytetrahydrofuran ether diol having m.w. c. 1000, and 1.12 g DBTL.

482.2 g Atlas®G 1350 was dissolved in the NCO prepolymer which was substantially free of NCO (<0.2% NCO), at 90° C. under stirring. Then 1823.8 g NH₄OH (2 wt.%) was added, followed by 5149.5 g water, in both cases stirring to uniformity. After cooling to room temperature, the emulsion was applied to the substrate, either directly or (for some substrates) with pH adjusted to 3–4, e.g. with phosphoric acid. The solids content was c. 43 wt.%.

Data for coating on steel plates and for films were obtained after curing of the emulsion at 200 watt/inch for 5 sec, with addition of 2 wt.% Darocur®1116:

| | |
|---|---|
| Koenig hardness (pendulum test, DIN 53 157) | 92 sec. |
| Erichsen cupping | 6.0 mm. |
| Coating thickness | [not stated] |
| Tensile strength (DIN 53 455) | 27.8 N/sq mm. |
| Elongation at failure | 13%. |

Solvent resistance:
  Rubbing test at 1 kg/sq cm:
    No damage from acetone, xylene, methyl ethyl ketone, or ethanol, in 100 rubs.
  Alkaline washing solution test:
    No damage in 10 30-minute cycles, with 4 wt.% NAOH in water at 80° C.

EXAMPLE 5

Urethane acrylate emulsion:

Basis: Isophoronediisocyanate-polyether polyol and dicyclohexylmethanediiisocyanate (Desmodur W) polyether polyol.

The method was analogous to that of Example 1, with the materials used here being 1110 g (5.0 mol) IPDI, 786 g (3.0 mol) dicyclohexylmethanediisocyanate (Desmodur W), 0.33 g DBTL, 2.48 g Ionol®CP, 39.7 g Tinuvin®292, 14.9 g Tinuvin® 900, 9.9 g Irganox®1010, 1414.3 g (12 mol) 2-hydroxyethyl acrylate, 656.1 g (1 mol) polytetrahydrofuran ether diol having m.w. c. 650, 993.9 g (1 mol) polytetrahydrofuran ether diol having m.w. c. 1000, and 1.12 g DBTL.

503 g Atlas®G 1350 was dissolved in the NCO prepolymer which was substantially free of NCO (<0.2% NCO), at 90° C. under stirring. Then 1900 g NH 4 OH (2 wt.%) was added, followed by 5372 g water at 50° C., in both cases stirring to uniformity. After cooling to room temperature, the emulsion was applied to the substrate, either directly or (for some substrates) with pH adjusted to 3–4, e.g. with phosphoric acid. The solids content was c. 43 wt.%.

Data for coating on steel plates and for films were obtained after curing of the emulsion at 200 watt/inch for 5 sec, with addition of 2 wt.% Darocur®1116:

| | |
|---|---|
| Koenig hardness (pendulum test, DIN 53 157) | 86 sec. |
| Erichsen cupping | 5.9 mm. |
| Coating thickness | [not stated]. |
| Tensile strength (DIN 53 455) | 27.5 N/sq mm. |
| Elongation at failure | 10%. |

Solvent resistance:
  Rubbing test at 1 kg/sq cm:
    No damage from acetone, xylene, methyl ethyl ketone, or ethanol, in 100 rubs.
  Alkaline washing solution test:
    No damage in 10 30-minute cycles, with 4 wt.% NAOH in water at 80° C.

EXAMPLE 6

Urethane urea acrylate:

Basis: Isophoronediisocyanate-urea-polyether polyol-Emulsion concentrate containing 75 wt.% solids.

250 g Atlas®G 1350 Was dissolved in 2497 g prepolymer (produced according to Example 1) at 90° C. under stirring.

945 g NH₄OH (2 wt.%) was added at c. 50° C. over a period of 3–5 min, and the mixture was mixed to uniformity with stirring. After cooling to room temperature, the emulsion concentrate was packaged.

| Viscosity: | |
|---|---|
| 25° C. | 110,000 mPa-sec. |
| 50° C. | 11,350 mPa-sec. |
| 70° C. | 1,825 mPa-sec. |

At an appointed time 3692 g emulsion concentrate at 70° C. was thinned with 2666.4 g water at 50° C., under stirring. After cooling to room temperature, the emulsion was applied to the substrate, either directly or (for some substrates) with pH adjusted to 3–4, e.g. with phosphoric acid. The solids content was c. 43 wt.%.

The physical data corresponded to those of Example 1.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of producing an aqueous radiation-curable urethane urea acrylate emulsion, comprising:
   mixing a cyclic polyisocyanate with water at a ratio of NCO equivalents to H₂O moles of about 10-20:>0-1, to form an NCO-containing urea polyisocyanate;
   reacting said NCO-containing urea polyisocyanate with hydroxyethyl acrylate at an equivalent ratio of NCO to OH of about 15-20:10-15, to form an NCO-containing urethane urea acrylate;
   reacting said NCO-containing urethane urea acrylate with a polyol in the absence of a solvent, at a temperature in the range of 50°-100° C., to form an essentially NCO-free resin; and
   emulsifying said essentially NCO-free resin in water containing a hexose alkoxylate ester of an unsaturated fatty acid as a nonionic surfactant.

2. The method of claim 1, wherein said cyclic polyisocyanate is isophoronediisocyanate (IPDI).

3. The method of claim 2, wherein IPDI is reacted with water at a ratio of NCO equivalents to H₂O moles of 19:1 and wherein said NCO-containing urea polyisocyanate is reacted with hydroxyethylacrylate at an equivalent ratio of NCO to OH of 19:13.

4. The method of claim 1, wherein said emulsion is obtained with an amount of water sufficient to provide a solids content of greater than 50 wt.%, to form an emulsion concentrate.

5. The method of claim 1, wherein said emulsion is obtained with an amount of water sufficient to provide an emulsion having a solids content of between 10 wt.% and 50 wt.%.

6. The method of claim 4, wherein said emulsion is obtained in an amount of water sufficient to provide an emulsion having approximately 75 wt.% solids content.

7. A method of producing an aqueous, radiation-curable urethane acrylate emulsion, comprising:

reacting a cyclic polyisocyanate with hydroxyethyl acrylate at an equivalent ratio of NCO to OH of about 15-20:10-15, to form an NCO-containing urethane acrylate;

emulsifying said NCO-containing urethane acrylate in water at a ratio of NCO equivalents to $H_2O$ moles of about 10-20:0-1 wherein a hexose alkoxylate ester of an unsaturated fatty acid is present as an emulsifying agent, to form an aqueous emulsion of an NCO containing urethane urea diacrylate; and reacting said aqueous emulsion with a polyol in the absence of solvent, at a temperature in the range of 50°-100° C.

8. The method of claim 7, wherein said emulsification is obtained in the presence of an alkali, selected from the group consisting of $NH_4OH$, KOH, and NaOH, at an alkaline pH of between 9-10, in the absence of an organic solvent.

9. The method of claim 8, wherein after emulsification is obtained the pH is adjusted with an acid to a pH of between 3-4.

10. The method of claim 9, wherein said acid is phosphoric acid.

11. An aqueous radiation-curable urethane acrylate emulsion prepared by the process of claim 1.

* * * * *